United States Patent [19]
Van Der Aue

[11] 3,859,244
[45] Jan. 7, 1975

[54] POST-CURABLE CURED POLYURETHANES SOLUBLE IN KETONES AND OTHER OXYGEN-CONTAINING SOLVENTS

[75] Inventor: John P. Van Der Aue, Akron, Ohio

[73] Assignee: The Goodyear Tire & Rubber Company, Akron, Ohio

[22] Filed: July 30, 1973

[21] Appl. No.: 383,368

Related U.S. Application Data
[63] Continuation of Ser. No. 207,614, Dec. 31, 1971.

[52] U.S. Cl.... 260/32.8 N, 260/75 NQ, 260/75 NT, 260/77.5 AN, 260/77.5 AP, 260/77.5 AQ, 260/77.5 AT
[51] Int. Cl............... C08g 51/34, C08g 22/10
[58] Field of Search........... 260/77.5 AN, 75 NH, 260/77.5 AM, 32.8 N, 75 NQ, 77.5 AQ

[56] References Cited
UNITED STATES PATENTS

| | | | |
|---|---|---|---|
| 2,753,319 | 7/1956 | Brockway | 260/30.6 |
| 2,929,800 | 3/1960 | Hill | 260/77.5 |
| 2,933,478 | 4/1960 | Young et al. | 260/77.5 |
| 3,051,687 | 8/1962 | Young et al. | 260/77.5 |
| 3,450,653 | 7/1969 | McClellan | 260/18 |
| 3,490,787 | 12/1969 | Bauriedel | 161/190 |

Primary Examiner—H. S. Cockeram
Attorney, Agent, or Firm—F. W. Brunner; H. C. Young, Jr.

[57] ABSTRACT

A post-curable cured polyurethane prepared by reacting an organic diisocyanate with a mixture which comprises from about 0.3 to about 4 moles of a selected hydroxyl terminated monomer diol, at least one hydroxyl terminated amine selected from primary and secondary amines and one mole of a polymeric polyol having a molecular weight of about 500 to about 3,000 selected from (A) polyester polyols selected from (1) the product of a hydroxyl terminated saturated aliphatic hydrocarbon diol and a saturated aliphatic dicarboxylic acid and from (2) polycaprolactones and (B) polyether polyols of the type prepared by polymerizing alkylene oxides and hydroxyl terminated saturated hydrocarbon diols, wherein the mole ratio of hydroxyl amine to said monomer diol is about 0.02:1 to about 0.5:1 and where isocyanato groups equal about 94 to 99 percent of the total reactive hydrogens followed by curing the mixture. The post-curable cured polyurethane is particularly useful as a durable coating for substrates and as a adhesive mixture when post-cured with a polyisocyanate having from 2 to 3 isocyanato groups.

5 Claims, No Drawings

POST-CURABLE CURED POLYURETHANES SOLUBLE IN KETONES AND OTHER OXYGEN-CONTAINING SOLVENTS

This is a continuation, of application Ser. No. 207,614 filed Dec. 13, 1971.

This invention relates to polyurethanes. It more particularly relates to post curable cured polyurethanes having good physical properties yet reduced viscosity in solution. It further relates to methods of preparing such polyurethanes, and to products prepared therefrom.

The combination of both good physical properties and substantially reduced viscosities in solution are sought after qualities of cured polyurethanes for practical coating applications. However, cured polyurethanes having good physical properties such as tensile and elongation typically form solutions which are too viscous for many commercial applications except at excessively low concentrations.

Polyurethanes can be cured with diamines to form cured polyurethanes having superior physical characteristics such as high tensile strengths and elongations. Hydroxyl amines have been used for such curatives. However, cured polyurethanes prepared with hydroxyl amine curatives have heretofore not been understood to have the combination of both superior physical properties and a sufficiently low viscosity in solution to be commercially practical for many applications. This has been a deterrent to the use of such cured polyurethanes for coatings.

In accordance with this invention, a post curable cured polyurethane having superior physical properties and reduced viscosity in solution has been found which is prepared by the method which compriser reacting an organic diisocyanate with a mixture which comprises from about 0.3 to about 4, preferably about 0.3 to about 3, moles of at least one hydroxyl terminated monomer diol selected from diethylene glycol, dipropylene glycol and saturated aliphatic hydrocarbon diols having 2 to 10 carbon atoms, at least one hydroxyl terminated amine having from about 2 to about 10 carbon atoms selected from primary and secondary amines, and one mole of a polymeric polyol having a molecular weight in the range of about 500 to about 3,000, preferably 500 to 2,500, selected from (A) polyester polyols selected from (1) the reaction product of a hydroxyl terminated saturated aliphatic hydrocarbon diol having 2 to 6 carbon atoms and a saturated aliphatic dicarboxylic acid having 4 to 10 carbon atoms with an acid number less than 10, preferably less than 5, and from (2) polycaprolactones derived from the reaction product of diols selected from diethylene glycol, 1,4-butane diol and 1,6-hexane diol with carpolactones having from about 6 to about 8, preferably 6, carbon atoms with 6 carbon atoms in the monomer ring, and (B) polyether polyols of the type prepared by polymerizing or copolymerizing alkylene oxides having 2 to 4 carbon atoms, such as ethylene oxide, propylene oxide, butylene oxide and tetrahydrofuran, and hydroxyl terminated saturated hydrocarbon diols having from 2 to 4 carbon atoms, wherein the mole ratio of said hydroxyl amine to said monomer diols in the range of about 0.02:1 to about 0.5:1, preferably about 0.02:1 to about 0.4:1, and even more desirably from about 0.03:1 to about 0.2:1, and where the isocyanato groups of the diisocyanate are equal to from about 94 to about 99, preferably about 96 to about 98, percent of the total reactive hydrogens supplied by the monomeric diol, the polymeric polyol and the hydroxyl amine, and curing the mixture. The reactive hydrogens are identified by the Zerewitenoff method and are the hydroxyl and amine groups of the said monomeric diol, polymeric polyol and hydroxyl amine.

Thus, it is an important feature of this invention that in addition to reacting certain amounts of certain materials, a particular order of addition is important in that it is preferred that a mixture is first prepared of the polymeric polyol, monomeric hydrocarbon diol, and the hydroxyl amine and then the organic diisocyanate is added to the mixture.

The post curable polyurethanes of this invention can be characterized by having good physical properties at 25°C. such as a Shore A hardness of about 65 to about 95, an ultimate tensile strength typically of about 2,000 to about 8,000, preferably about 4,000 to about 7,000, pounds per square inch and an ultimate elongation of about 200 to about 900, preferably about 400 to 700 percent, according to generally accepted rubber testing procedures with an Instron apparatus.

The methyl ethyl ketone soluble post curable cured polyurethanes of this invention can also surprisingly be characterized by exhibiting at about 25°C. a viscosity in solution in the range of about 10 to about 10,000 and preferably about 20 to 1,000 centipoises at a concentration of about 20 weight percent in methyl ethyl ketone based on the total solution. Although said polyurethanes are typically soluble in methyl ketone, any somewhat insoluble therein can, in the alternative, be characterized by a viscosity in the range of about 100 to about 22,000 and preferably about 300 to 10,000 centipoises, as a 20 weight percent solution in dimethyl formamide at 25°C. The cured polyurethanes of this invention can usually further be characterized by solutions having a viscosity of less than about 30,000, preferably less than about 10,000 centipoises at concentrations even up to about 40 weight percent in methyl ethyl ketone at 25°C.

In this invention, the various hydroxyl terminated aliphatic hydrocarbon monomer diols in addition to the diethylene and dipropylene glycols are selected from straight chain and branched chain hydrocarbon diols having 2 to 10 carbon atoms. Representative of the straight chain diols are ethylene glycol, 1,3-propane diol, 1,4-butane diol, 1,5-pentane diol, 1,6-hexane diol, 1,7-heptane diol, 1,8-octane diol, 1,9-nonane diol and 1,10-decane diol. Representative of branched chain diols are neopentyl glycol and 1,3-butane diol. The preferred aliphatic monomer diols are ethylene glycol, 1,3-propane diol, 1,4-butane diol, neopentyl glycol and dipropylene glycol.

The polyester polyols for this invention are generally those prepared from the reaction of diols, such as ethylene glycol, 1,3-propane diol, 1,4-butane diol, 1,5-pentane diol and 1,6-hexane diol with dicarboxylic acids such as succinic acid, adipic acid, suberic acid, azelaic acid and sebacic acid. Preferably they are prepared from 1,4-butane diol and adipic acid.

Representative of the various polycaprolactones for the practice of this invention are those prepared by reacting the diols with caprolactones selected from ε-caprolactone, zeta caprolactone and eta caprolactone. Alkyl substituted caprolactones can be used substituted with methyl and ethyl radicals, such as methyl ε-caprolactone. The ε-caprolactone is the preferred caprolactone and the preferred polycaprolactone is prepared from ε-caprolactone and diethylene glycol.

Preferred polyether polyols are polyalkylene ether polyols with hydroxyl functionalities of 2 to 3, preferably 2, such as polypropylene ether glycol and the polytetramethylene ether glycols.

Representative of the various hydroxyl terminated primary and secondary amines for this invention are diglycol amine, monoethanol amine, 1,3-diamino-2-hydroxy propane, 2-amino-butanol, 2-amino-2-methyl-1,3-propane diol, and 2-amino-2-ethyl-1,3-propane diol, as well as the various hydroxyl terminated secondary amines, such as diethanol amine. The diglycol amine and 2-amino-2-methyl-1,3-propane diol are preferred.

Difunctional organic polyisocyanates are used in the practice of this invention, representative of which are the 2,4- and 2,6-toluene diisocyanates, the 1-methylcyclohexyl-2,4-and 2,6- diisocyanates, diphenyl methane-4,4'-diisocyanate, 4,4'-diphenyl diisocyanate, o- and p-phenylene diisocyanate, o-tolidine diisocyanate, dianisidine diisocyanate, 1,6-hexamethylene diisocyanate, 3-isocyanatomethyl-3.5.5-trimethyl cyclohexyl isocyanate, or isophorone diisocyanate and 4,4'dicyclohexyl methane diisocyanate. The toluene diisocyanates, diphenyl methane-4,4'-diisocyanate, isophorone diisocyanate, 4,4'-dicyclohexyl methane diisocyanate and the 1-methyl 2,4- and 2,6-cyclohexyl diisocyanates are preferred.

In the practice of this invention, the diisocyanate is added to the mixture of diol monomer, polymeric polyol and hydroxyl terminated primary or secondary amine and a polymerization reaction carried out generally over a period of from about a minute up to an hour or more. Usually a reaction time of from about 1 to about 10 minutes is sufficient to prepare the polymeric polyurethanes of this invention. The temperature of the polymerization reaction can be varied over a wide range, such as about 60°C. to about 100°C., although higher or lower temperatures can be used. Also, the reaction pressure can be varied over a wide range and may be atmospheric or above or below atmospheric pressure, although it is desired that at least an autogenous pressure of the mixture be used.

The resulting polyurethane is then heated to effect the cure. It is generally preferred that the polyurethane is cured in an inert and relatively dry atmosphere. A temperature of from about 100°C. to about 200°C. for about 10 minutes to about 6 hours at about atmospheric pressure is generally sufficient to effect the cure although higher or lower temperatures can be used.

The cured polymeric polyurethanes of this invention have superior physical properties and can be dissolved in a suitable solvent, if desired, to form solutions and applied to substrates for protective and decorative castings, coatings, cements and the like.

Various solvents can be used to dissolve the post curable cured polyurethanes of this invention. Representative examples of such solvents include dimethyl formamide, dimethyl acetamide, dimethyl propionamide, dimethyl sulfoxide, tetrahydrofuran and liquid ketones selected from acetone, methyl ethyl ketone, diisobutyl ketone and methyl isobutyl ketone.

The solutions of this invention may be formed by methods of preparing solutions of elastomers known to those skilled in the art. The cured polyurethane solvent mixture may be heated to decrease the time required to prepare these solutions. Generally about 20 to about 40 weight percent solutions of the cured polyurethane can be prepared at about 25°C. with the solutions becoming more viscous as the solids content is increased. Thus, the solids content of the solution can be varied depending upon the intended application or use.

It is a further advantage of this invention that the cured polyurethane having superior physical properties can now be prepared and stored in solvents for long periods of time and the solution used to coat various structural surfaces or fabrics and for forming various structures. Heretofore, coatings of polyurethanes having superior physical properties were applied in solvents at low concentrations or applied as reaction mixtures. Such reaction mixtures were prepared by immediately coating materials or immediately filling molds with the liquid polyester-polyurethane reaction mixture after the curative diisocyanate was added and then curing the reaction mixture to form a coated or structural product.

The post curable cured polyurethanes of this invention can be postcured with organic polyisocyanates having an isocyanato functionality in the range of 2 to 3. The ratio of isocyanato groups of the post curative polyisocyanate to the reactive hydrogens of the said cured polyurethane is generally about 1:1 to about 20:1 and preferably about 2:1 to about 10:1. The reactive hydrogens of the post curable cured polyurethane are the reactive hydrogens of the hydrocarbon diol, polyester and diamine as determined by the Zerewitinoff method in stoichiometric excess of the isocyanato groups of the diisocyanate used to prepare the post curable cured polyurethane.

In practice, the post curable cured polyurethanes are dissolved in a volatile organic solvent and the organic polyisocyanate post curative added to the solution. The solution usually contains from about 1 to about 50 percent by weight of the post curable cured polyurethane and the post curative organic polyisocyanate, although higher or lower concentrations can also be used depending upon the solvent used and the intended application such as concentrations of from about 0.5 to about 80 percent by weight. If desired, the solutions can be prepared at about 25°C to about 50°C or at higher temperatures above 50°C, such as from about 50°C to about 100°C or higher, although it is usually desired to form the solutions below the boiling point of the solvent used. Lower temperatures can also be used to prepare the solutions but the rate of solution is usually unnecessarily slow. The solutions can be formed at atmospheric pressure or above or below atmospheric pressure.

In practice, various solvents can be used. Representative examples of the various solvents of the volatile organic type are liquid ketones such as methyl ethyl ketone, diisobutyl ketone, methyl isobutyl ketone; cyclic ketones such as cyclohexanone, methylcyclohexanone, and isophorone; esters such as ethyl acetate and butyl acetate; nitrobenzene, chlorobenzene, dioxane, tetrahydrofuran, N-methyl-2-pyrolidone, N,N-dimethylformamide and their mixtures. Other diluents such as dimethyl sulfoxide can be used with the solvents.

The post curable solution has particular utility as an adhesive when applied to a substrate and post cured.

Various organic polyisocyanate post curatives having from 2 to 3 isocyanato groups can be used to post cure the said post curable cured polyurethane. Representative of such polyisocyanates are the 2,4- and 2,6-toluene diisocyanates, 1-methylcyclohexyl-2,4- and 2,6-diisocyanates, phenylene diisocyanates, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, diphenylmethane-4,4'diisocyanate, 3,3'-dimethyl-4,4'-bis-phenylene diisocyanate, isophorone diisocyanate, 1,5-tetrahydronaphthalene diisocyanate, triphenylmethane triisocyanate, and mixtures of such polyioscyanates. Polyisocyanate-polyol adducts can be used.

For greater polymer strength, it is generally desired that the polyisocyanate or polyisocyanate mixture has an average isocyanato group content of from about 2.5 to about 2.8. Such polyisocyanates can be polymethylene polyphenylisocyanates having from 2.5 to 2.8 isocyanato groups of the type prepared from an aldehyde amine condensation product which has been phosgenated to give a polyisocyanate or mixture of polyisocyanates. Preparation of polyisocyanates of this type is illustrated in U.S. Pat. No. 2,683,730. The polyisocyanate mixtures can be prepared, for example, by mixing at least one polyisocyanate selected from the polymethylene polyphenylisocyanate and a triisocyanate such as triphenylmethane triisocyanate with at least one diisocyanate such as, for example, diphenylmethane diisocyanate.

When used as an adhesive, it is preferred that the post curable composition solution is applied to the surface of one of the substrates to be adhered, dried, until it is almost tackfree, the surfaces to be adhered brought together, and the adhesive composition cured to form an adherent bond between the substrates. It is preferred that the adhesive composition is air cured with the application of heat such as, for example, at a temperature of from about 20°C to about 150°C for about 1 to about 10 hours.

Experiments A and D used a sulfone diamine instead of a hydroxyl terminated primary amine to represent a comparative control.

In these experiments, one mole of a 1,4-butane diol adipate was placed in a reactor. The adipate or polyester had a molecular weight of about 1,000, a hydroxyl number of 112, an acid number of about 0.5 and a water content of less than 0.5 percent. The polyester was liquified by heating to about 90°C. and stirred for one hour at this temperature at a reduced pressure of about 5 to 10 millimeters of mercury absolute. The pressure was then adjusted to atmospheric pressure.

With the polyester was mixed a monomeric diol and various amounts of at least one hydroxyl terminated primary or secondary amine except for Experiment A where the sulfone diamine was used. To this mixture was then added various amounts of 4,4'-diphenyl methane diisocyanate (MDI) with stirring for about two minutes and the resulting mixture poured into a suitable container and sealed. The mixture in the sealed container was allowed to cure for three hours in a forced air oven at about 140°C. The cured polymer was removed from the container and cut up into small pieces. The cured polymer was dissolved as 10, 20 and 30 weight percent solids solutions in dimethyl formamide (DMF) and the solution viscosity was measured in centipoise (cps) with a Number 2 spindle of a model LVF Brookfield viscometer at about 25°C. A portion of the solution was cast onto a glass plate and allowed to dry. Samples were taken of the casting having about a 5 mil thickness for determination of its ultimate tensile strength in pounds per square inch (psi), ultimate elongation as a percent as well as its 100, 300 or 500 percent modulus at about 25°C. by generally recognized rubber testing procedures.

The amounts of reactants in moles, the viscosities in centipoises of the 10, 20 and 30 percent solutions in the DMF, the Shore A hardnesses, as well as the ultimate tensile and elongation and modulus are shown in Table 1.

Table 1

|  | A | B | C | D | E | F | G |
|---|---|---|---|---|---|---|---|
| Adipate | 1.00 | 1.00 | 1.00 | 1.00 | 1.00 | 1.00 | 1.00 |
| Sulfone diamine | .04 | | | .04 | | | |
| Diglycol amine | | .04 | .06 | | .04 | .06 | |
| Monoethanol amine | | | | | | | .04 |
| Butane diol | .60 | .60 | .60 | .60 | .60 | .60 | .60 |
| MDI | 1.55 | 1.55 | 1.57 | 1.59 | 1.59 | 1.61 | 1.55 |
| Hardness Shore A | 77 | 78 | 78 | 78 | 78 | 78 | 79 |
| VISCOSITY (cps) | | | | | | | |
| 10% DMF | 37 | 35 | 38 | 554 | 338 | 107 | 38 |
| 20% DMF | 466 | 402 | | 21,950 | 12,040 | 2700 | |
| 30% DMF | 3400 | 3210 | | | | | |
| TENSILE (psi) | | | | | | | |
| 100% modulus | 585 | 600 | 464 | 625 | 645 | 635 | 615 |
| 300% modulus | 1155 | 1100 | 790 | 1825 | 1690 | 1515 | 1165 |
| 500% modulus | 2960 | 2610 | 2335 | | | 6190 | 2850 |
| Ultimate | 4165 | 3910 | 4400 | 7035 | 6420 | 7725 | 4665 |
| Ult. E, % | 615 | 620 | 620 | 430 | 450 | 540 | 600 |

The following examples further illustrate this invention. The parts and percentages are by weight unless otherwise indicated.

EXAMPLE I

Several experiments were conducted in order to demonstrate the invention and labeled A through G.

Thus the results of these experiments clearly show that the addition of the hydroxyl amines to the polyol mixture prior to the addition of the diisocyanate produce a cured polyurethane with a substantially reduced viscosity in solution without substantially reducing its good physical properties. More specifically, Experiments A and D utilizing a sulfone diamine and an isocyanato to reactive hydrogen group mole ratio of about 0.94 and about 0.97, respectively, a 20 percent solution viscosity in DMF of about 470 to about 22,000 cps, respectively, whereas substantially the same respectively comparative formulations substituting the diglycol amine or monoethanol amine resulted in a polyurethane having a 20 percent solution viscosity in DMF of only about 400 and 12,000 cps for Experiments B and E and 38 cps for the 10 percent solution of Experiment G. Thus, the results are more dramatic at the higher isocyanato to reactive hydrogen ratios. The tensile strengths of these materials was only reduced from 4,170 to 3,910 from Experiments A to B, increased from 4,170 to 4,670 from Experiments A to G and only reduced from 7,040 to about 6,420 from Experiments D to E. Thus, the physical properties were not unduly sacrificed and a post curable cured polyurethane resulted having substantially enhanced commercial practicality.

EXAMPLE II

To a reactor was charged 6.6 parts of diglycol amine, 86 parts of diethylene glycol and 400 parts of a polycaprolactone having a molecular weight of about 500 derived from ε-caprolactone and diethylene glycol. The polycaprolactone had been degassed by stirring for about one hour at about 66°C. and a reduced pressure of about 5–10 millimeters of mercury. To the mixture was then added 276 parts of an 80:20 molar mixture of 2,4- and 2,6-toluene diisocyanate. The mixture was then cured in a forced air oven at about 140°C. for about 3 hours. The cured polymer was removed from the oven, cut into small pieces and dissolved in methyl ethyl ketone to form a 25 weight percent solution. The solution had a viscosity of 138 centipoises (cps) at about 25°C. using a Number 2 spindle of the Brookfield Viscometer, model LVF.

EXAMPLE III

To a reactor was charged 400 parts of a 1,4 butane diol adipate having a molecular weight of about 1,000, 4.3 parts of diglycol amine and 29.3 parts of ethylene glycol. The polyester had been degassed for about one hour at about 90°C. at about 5–10 millimeters mercury pressure. To the mixture was then added 261 parts of 4,4′-diphenyl methane diisocyanate and the resulting mixture cured in a forced air oven at about 14°C. for about 3 hours.

The cured polymer was broken into small pieces and dissolved in tetrahydrofuran to form a 20 weight percent solution having a viscosity of about 300 cps at 25°C.

The cured polyurethane of this example was analyzed by generally accepted rubber testing procedures to have a Shore A hardness of 85 at 25°C., an ultimate tensile of 7,420 pounds per square inch (psi) and an elongation of 410 percent with a 100 percent modulus of 1,100 psi and 300 percent modulus of about 4,320 psi.

EXAMPLE IV

To a reactor was charged 1,000 parts of a polycaprolactone of the type derived from ε-caprolactone and diethylene glycol having a molecular weight of about 500, 12.2 parts of diglycol amine, 63.1 parts of ethylene glycol and 0.2 parts of dibutyltin dilaurate catalyst. The polycaprolactone had been degassed for about 1 hour at about 66°C. at about 5–10 millimeters mercury. To the mixture was then added 778.3 parts of the liquid form of 4,4′-dicyclohexyl methane diisocyanate and the resulting mixture cured in a forced air oven at about 140°C. for about 3 hours.

The cured polymer was broken into small pieces and dissolved in methyl ethyl ketone to form a 20 percent solution having a viscosity of about 150 cps at 25°C.

The cured polymer had a Shore A hardness of about 80, an ultimate tensile strength of about 4,320 psi at an elongation of 480 percent at about 25°C.

EXAMPLE V

To a reactor was charged 4.7 parts of diglycol amine, 59.8 parts of diethylene glycol, 60.2 parts of hydroxy ethyl hydroquinone as a hardening agent and 400 parts of a polycaprolactone having a molecular weight of about 500 and derived from ε-caprolactone. The polycaprolactone had been degassed as in Example IV. To the mixture was then added 286 parts of an 80:20 molar mixture of 2,4- and 2,6-toluene diisocyanates and the resulting mixtures cured in a forced air oven at about 140°C. for about 3 hours. The cured polymer was analyzed to have a high Shore D hardness of about 68.

The cured polymer was broken into small pieces and dissolved in methyl ethyl ketone to form a 20 weight percent solution having a viscosity at about 103 cps at about 25°C.

EXAMPLE VI

To a reactor was charged 11.9 parts of diglycol amine, 126 parts of ethylene glycol, 0.4 part of dibutyltin dilaurate catalyst and 1,000 parts of 1,270 molecular weight polycaprolactone of the type prepared from ε-caprolactone initiated with diethylene glycol which had previously been degassed at about 90°C. for about 1 hour at a reduced pressure of about 5 to 10 millimeters of mercury. To this mixture was then added 638.5 parts of isophorone diisocyanate and the resulting mixture cured in a forced air oven at about 140°C. for about 3 hours.

The cured polymer was analyzed to a Shore A hardness of 73 at 25°C. A 20 weight percent solution of the polymer in methyl ethyl ketone was found to have a viscosity of 45 centipoises at about 25°C. with the Brookfield viscometer.

The physical properties of the polymer at about 25°C. were as follows:

| | | |
|---|---|---|
| 100 percent modulus | — | 340 psi |
| 300 percent modulus | — | 930 psi |
| 500 percent modulus | — | 5770 psi |
| ultimate tensile | — | 6195 psi |
| ultimate elongation | — | 510 percent |

EXAMPLE VII

To a reactor was charged 8 parts of diglycol amine, 100.7 parts of ethylene glycol, 4 parts of 2,6-ditertiary isobutyl paracresol, as an antioxidant, 0.6 part of dibutyltin dilaurate catalyst and 400 parts of 1,000 molecular weight polypropylene ether glycol which had previously been degassed at 66°C. at a reduced pressure. To this mixture was then added 448.7 parts of isophorone diisocyanate and the resulting mixture cured in a forced air oven at about 140°C. for about 3 hours.

The cured polymer was analyzed to have a Shore D hardness of about 65 at 25°C. A 20 weight percent solution of the polymer in methyl ethyl ketone was found to have a viscosity of about 15 cps at about 25°C. with the Brookfield viscometer.

The physical properties of the polymer at about 25°C. were as follows, according to generally accepted rubber testing procedures:

| | | |
|---|---|---|
| 100% modulus | — | 1500 psi |
| 300% modulus | — | 2240 psi |
| ultimate tensile | — | 2380 psi |
| ultimate elongation | — | 325 percent |

EXAMPLE VIII

To a reactor was charged 11 parts of diglycol amine, 45.5 parts of ethylene glycol, 0.2 parts of dibutyl tin dilaurate catalyst and 1,000 parts of a 500 molecular weight polycaprolactone of the type derived from ε-caprolactone and diethylene glycol. The polycaprolactone had been degassed as in Example IV. To the mixture was then added 700 parts of the liquid form of 4,4'-dicyclohexyl methane diisocyanate and the resulting mixture cast onto a glass plate and cured in a forced air oven at about 140°C for about 3 hours.

A portion of the cured polymer was analyzed to have a Shore A hardness of 74 at about 25°C and another portion dissolved in methyl ethyl ketone to form a 20 percent solution having a viscosity of 167 cps by the Brookfield viscometer at about 25°C.

To a portion of the 20 percent methyl ethyl ketone solution was added 17 parts of a diisocyanate having an isocyanato functionality of about 2.3 derived from toluene diisocyanate, hexamethylene diisocyanate and a low molecular weight aliphatic diol, (obtained as Mondur HC, a trademark of the Mobay Chemical Co.), to form a reactive mixture.

The reactive mixture, suitable for application as an adhesive, was cast onto a glass plate and post-cured by first allowing to air dry at 25°C for about 1 hour and then placing in a forced air oven at about 66°C for about 10 to 15 minutes.

The physical properties of both the cured polymer and the post-cured polymer are shown in Table 2.

TABLE 2

| Properties | Cured Polymer | Post-Cured Polymer |
|---|---|---|
| 100% modulus (psi) | 130 | 185 |
| 300% modulus (psi) | 245 | — |
| 500% modulus (psi) | 825 | — |
| Ultimate tensile (psi) | 2,034 | 4,360 |
| Ultimate elongation (%) | 615 | 205 |

While certain representative embodiments and details have been shown for the purpose of illustrating the invention, it will be apparent to those skilled in this art that various changes and modifications may be made therein without departing from the spirit or scope of the invention.

What is claimed is:

1. A cured polyurethane, post-curable with organic polyisocyanates containing 2 to 3 isocyanato groups, characterized by having at 25°C a Shore A hardness in the range of about 65 to about 95, an ultimate tensile strength in the range of about 2,000 to about 8,000 pounds per square inch gauge, and an ultimate elongation in the range of about 200 to about 900 percent, said cured polyurethane prepared by the method which comprises reacting, at a temperature in the range of about 60°C to about 200°C, an organic diisocyanate with a mixture which consists essentially of from about 0.3 to about 4 moles of at least one hydroxyl terminated monomer diol selected from diethylene glycol, dipropylene glycol and saturated aliphatic hydrocarbon diols having from 2 to 10 carbon atoms, at least one hydroxyl terminated amine having 2 to 10 carbon atoms selected from primary and secondary amines and one mole of a polymeric polyol having a molecular weight in the range of about 500 to about 3,000 selected from (A) polyester polyols selected from (1) the reaction product of a hydroxyl terminated saturated aliphatic hydrocarbon diol having 2 to 6 carbon atoms and a saturated aliphatic dicarboxylic acid having 4 to 10 carbon atoms with an acid number less than 10 and from (2) polycaprolactones derived from the reaction of diols selected from diethylene glycol, 1,4-butane diol and 1,6-hexane diol with caprolactones having 6 to 8 carbon atoms and (B) polyether polyols prepared by polymerizing or copolymerizing alkylene oxides having from 2 to 4 carbon atoms and hydroxyl terminated saturated hydrocarbon diols having 2 to 4 carbon atoms, wherein the mole ratio of said hydroxyl terminated amine to said monomer diols is in the range of about 0.02:1 to about 0.5:1 and where the isocyanato groups of the diisocyanate are equal to from about 94 to about 99 percent of the total reactive hydrogens supplied by the monomeric diol, the polymeric polyol, and the hydroxyl amine and curing the mixture.

2. The post-curable cured polyurethane of claim 1 characterized by exhibiting at about 25°C. a viscosity in solution in the range of about 10 to about 10,000 cps at a concentration at about 20 weight percent in methyl ethyl ketone based on the total solution.

3. The post-curable cured polyurethane of claim 1 where the said aliphatic monomer diols are selected from dipropylene glycol, ethylene glycol, 1,3-propane diol, 1,4-butane diol, and neopentyl glycol, where the polymeric polyols are selected from (A) polyester polyols selected from (1) the reaction product of diols selected from ethylene glycol, 1,3-propane diol, 1,4-butane diol, 1,5-pentane diol and 1,6-hexane diol with dicarboxylic acids selected from adipic acid, succinic acid and azelaic acid and from (2) polycaprolactones derived from the reaction of diethylene glycol with ε-caprolactone and (B) polyether polyols selected from polypropylene ether glycol and polytetramethylene ether glycol, where the organic diisocyanate is selected from 2,4- and 2,6-toluene diisocyanates, diphenyl methane, 4,4'-diisocyanate, isophorone diisocyanate, 4,4'-dicyclohexylmethane diisocyanate and 1-methyl-2,4 and 2,6-cyclohexyl diisocyanates and where the hydroxyl terminated amines are selected from diglycol amine, monoethanol amine, 1,3-diamino-2-hydroxy propane, 2-amino-1-butanol, 2-amino-2-methyl-1,3-propane diol, 2-amino-2-ethyl-1,3-propane diol and diethanol amine.

4. The post-curable cured polyurethane of claim 3 where the mole ratio of said hydroxyl terminated amine to said monomer diol is about 0.03:1 to about 0.2:1 and where the isocyanato groups of the diisocyanate are equal to about 96 to about 98 percent of said total reactive hydrogens.

5. The post-curable cured polyurethane of claim 3 characterized by having at 25°C. an ultimate tensile strength of about 4,000 to about 7,000 pounds per square inch, an ultimate elongation of about 200 to about 900 percent and a viscosity in solution of about 20 to about 1,000 centipoises at a concentration of about 20 weight percent in methyl ketone based on the total solution, where said polymeric polyols have a molecular weight of about 500 to about 2,500 selected from (A) polyester polyols prepared from 1,4-butane diol and adipic acid and (B) polyether polyols selected from propylene ether glycol and polytetramethylene ether glycol, where the hydroxyl terminated amines are selected from diglycol amine and 2-amino-2-methyl-propane diol.

* * * * *